United States Patent
Filippone

(10) Patent No.: US 9,618,273 B2
(45) Date of Patent: Apr. 11, 2017

(54) MODULAR HEAT EXCHANGER AND CONVERSION SYSTEM

(76) Inventor: Claudio Filippone, College Park, MD (US)

(*) Notice: Subject to any disclaimer, the term of this patent is extended or adjusted under 35 U.S.C. 154(b) by 0 days.

(21) Appl. No.: 13/094,820

(22) Filed: Apr. 26, 2011

(65) Prior Publication Data

US 2011/0259553 A1 Oct. 27, 2011

Related U.S. Application Data

(60) Provisional application No. 61/343,242, filed on Apr. 26, 2010.

(51) Int. Cl.
| | |
|---|---|
| *F28D 15/02* | (2006.01) |
| *F01K 23/06* | (2006.01) |
| *F28D 7/10* | (2006.01) |
| *F01N 5/02* | (2006.01) |
| *F22B 1/02* | (2006.01) |
| *F28D 21/00* | (2006.01) |

(52) U.S. Cl.
CPC ............... *F28D 15/02* (2013.01); *F01N 5/02* (2013.01); *F22B 1/02* (2013.01); *F28D 7/103* (2013.01); *F28D 21/0003* (2013.01); *Y02E 20/14* (2013.01); *Y02T 10/16* (2013.01)

(58) Field of Classification Search
CPC . F28D 7/10–7/14; Y02T 10/16–10/166; Y10T 29/49361
USPC ........... 60/614–624, 643–681; 122/221, 246, 122/323; 165/154–156
See application file for complete search history.

(56) References Cited

U.S. PATENT DOCUMENTS

| | | | | |
|---|---|---|---|---|
| 3,796 | A * | 10/1844 | Robbins ................. | F28D 7/103 110/306 |
| 572,797 | A * | 12/1896 | Hathaway ............... | F28D 7/106 165/154 |
| 1,319,628 | A * | 10/1919 | Simmons ............... | F02M 63/00 165/52 |
| 1,715,630 | A * | 6/1929 | Snell ........................ | F01N 5/02 165/51 |
| 1,775,939 | A * | 9/1930 | Matthaei ............ | B60H 1/00335 165/155 |
| 1,871,322 | A * | 8/1932 | Hodgins ................. | F28D 21/00 126/108 |
| 2,752,128 | A * | 6/1956 | Dedo ............................ | 165/155 |
| 4,090,558 | A * | 5/1978 | Akama ................... | F23L 15/04 165/135 |
| 4,235,077 | A * | 11/1980 | Bryant ............................ | 60/618 |
| 4,256,170 | A * | 3/1981 | Crump ........................ | 165/154 |

(Continued)

FOREIGN PATENT DOCUMENTS

| | | | | |
|---|---|---|---|---|
| DE | 1735164 U | * | 12/1956 | |
| DE | 3153101 C2 | * | 9/1985 | ............... F01P 3/18 |
| FR | 1121849 A | * | 8/1956 | ............. F28D 7/103 |

*Primary Examiner* — Thomas Denion
*Assistant Examiner* — Laert Dounis

(57) ABSTRACT

Various embodiments of a waste heat recovery and conversion system are disclosed. The system may include a modular heat exchanger whose energy source is provided by waste heat energy transporting fluids transferring their energy to a working fluid. The working fluid may be in a liquid state contained in a reservoir hydraulically connected to a high-pressure heat transfer chamber. The high-pressure heat transfer chamber may be configured to receive thermal energy utilized to convert the working fluid into a superheated vapor.

22 Claims, 14 Drawing Sheets

(56) References Cited

U.S. PATENT DOCUMENTS

| | | | | |
|---|---|---|---|---|
| 4,996,845 A | * | 3/1991 | Kim | B60H 1/00007 237/12.1 |
| 5,915,619 A | * | 6/1999 | Etheve | B60H 1/18 165/155 |
| 6,390,185 B1 | * | 5/2002 | Proeschel | F28D 7/103 165/141 |
| 6,431,258 B1 | * | 8/2002 | Konishi | B05C 11/08 138/38 |
| 7,430,865 B2 | * | 10/2008 | Filippone | 60/618 |
| 8,707,701 B2 | * | 4/2014 | Burkhart | F01K 27/00 60/641.2 |
| 2007/0039725 A1 | * | 2/2007 | Valensa | B01B 1/005 165/177 |

* cited by examiner

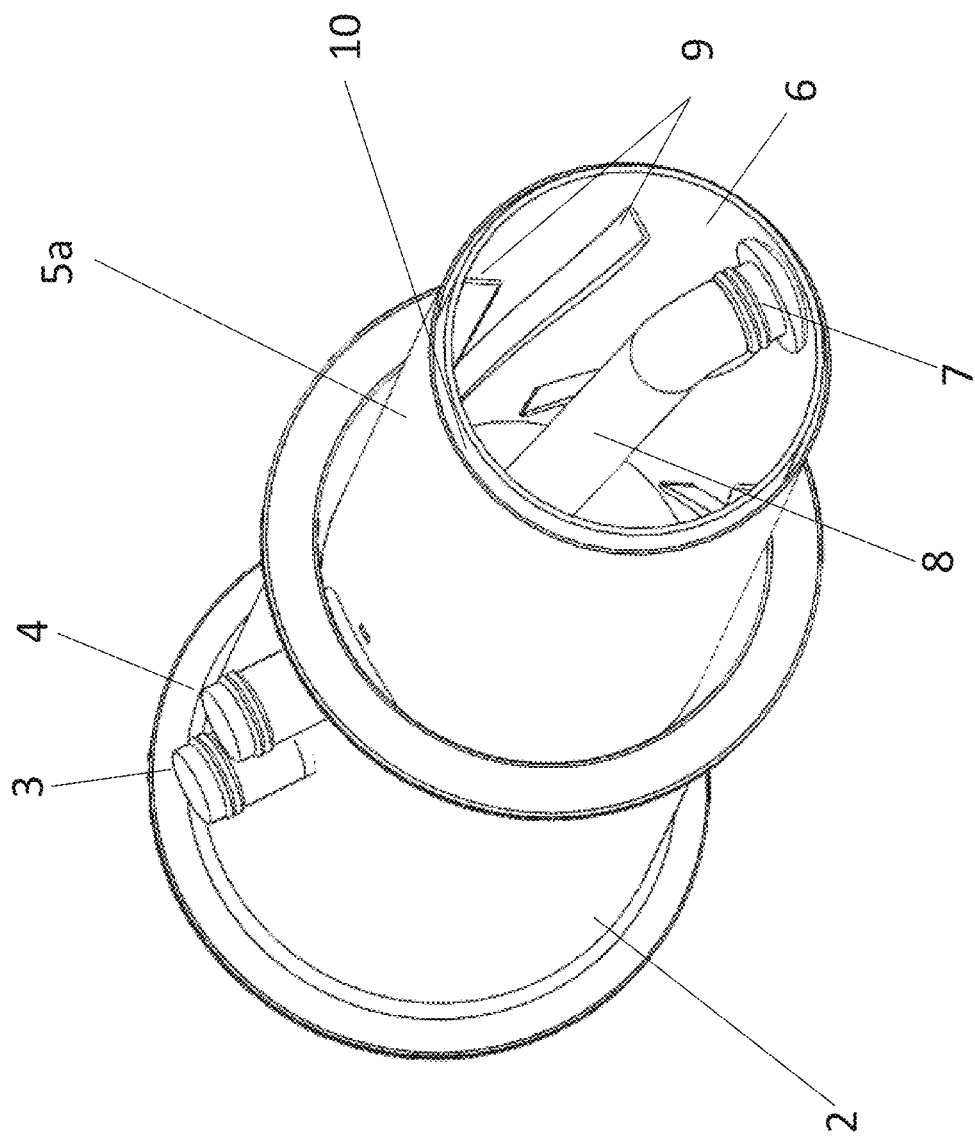

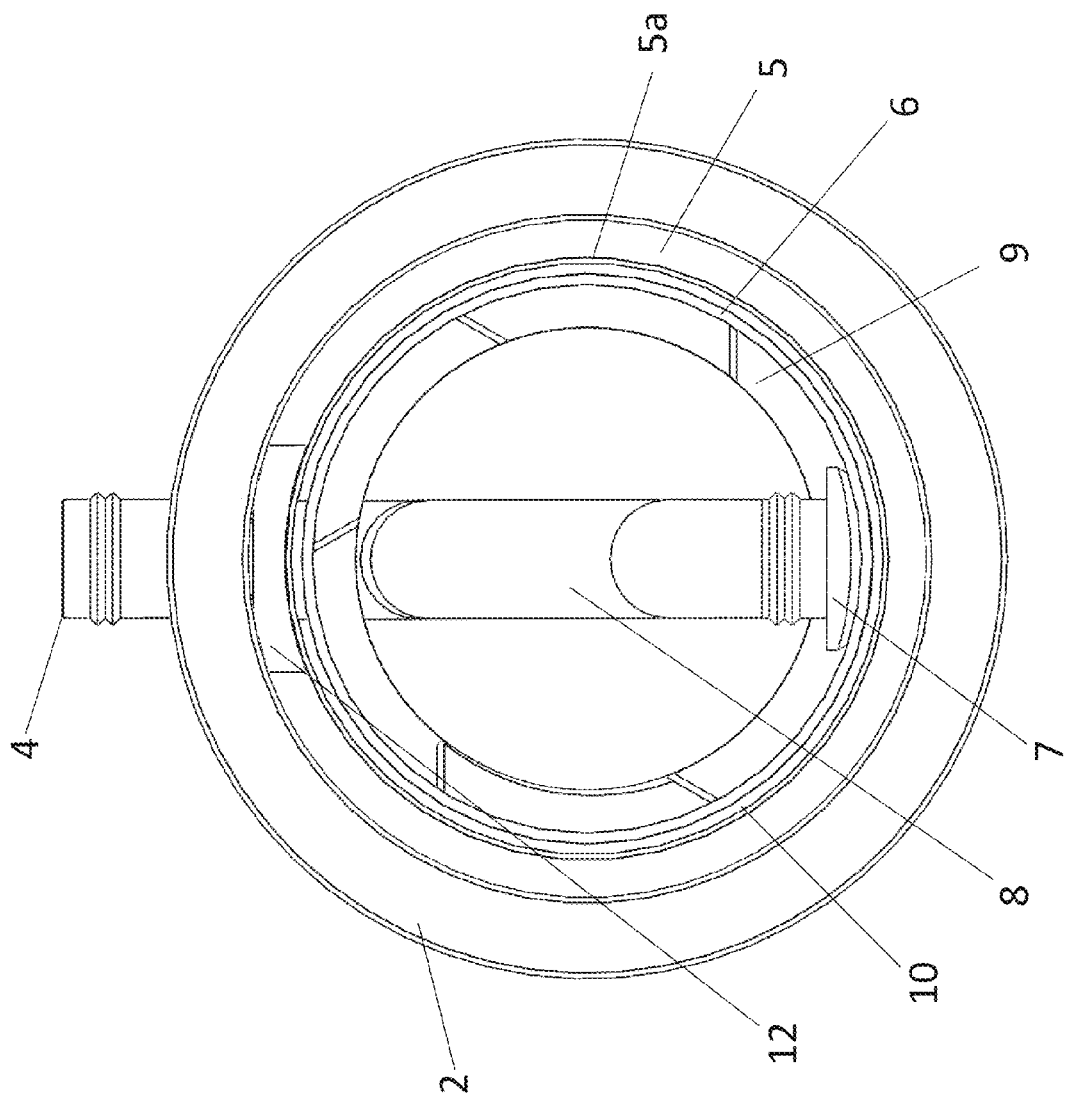

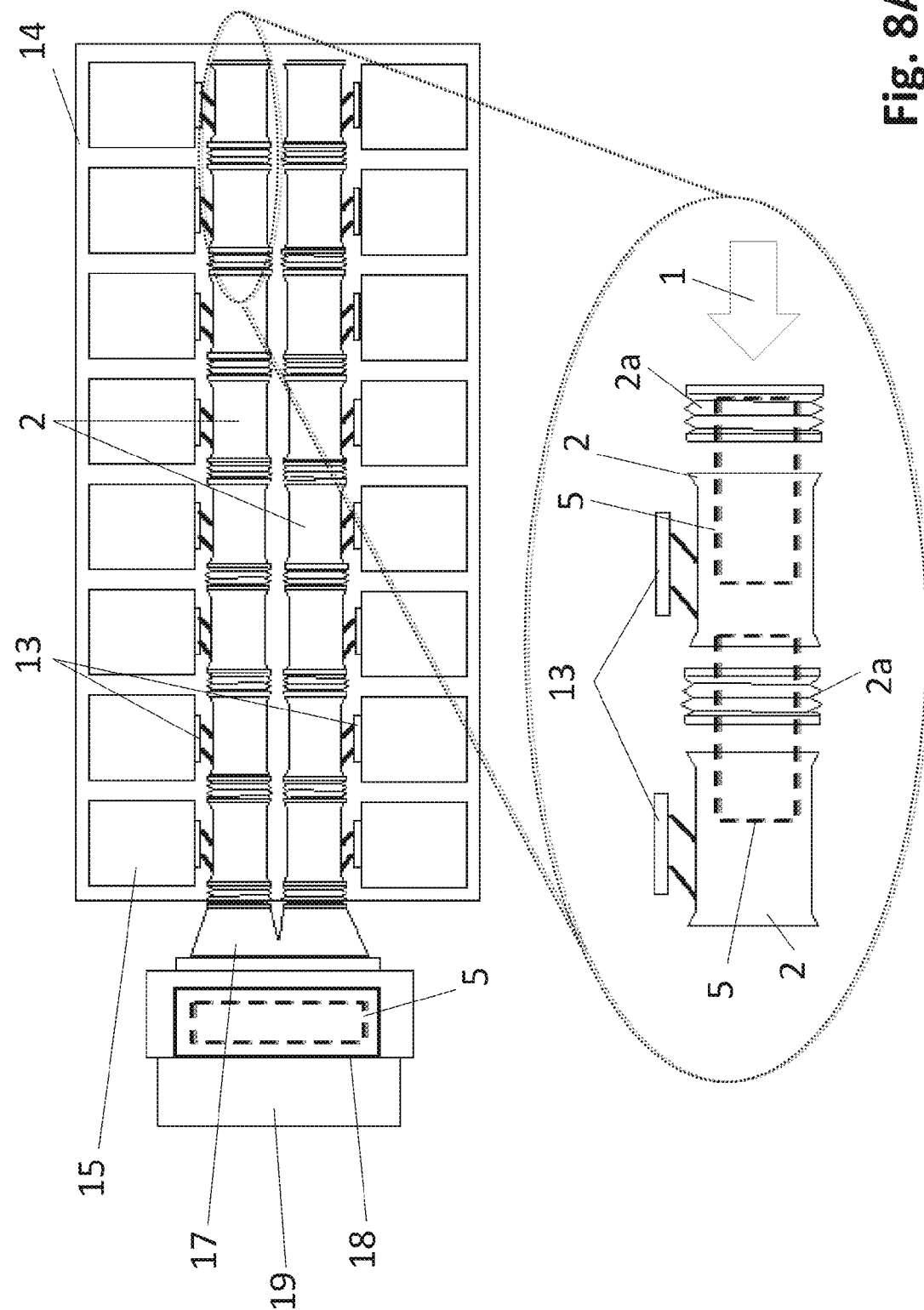

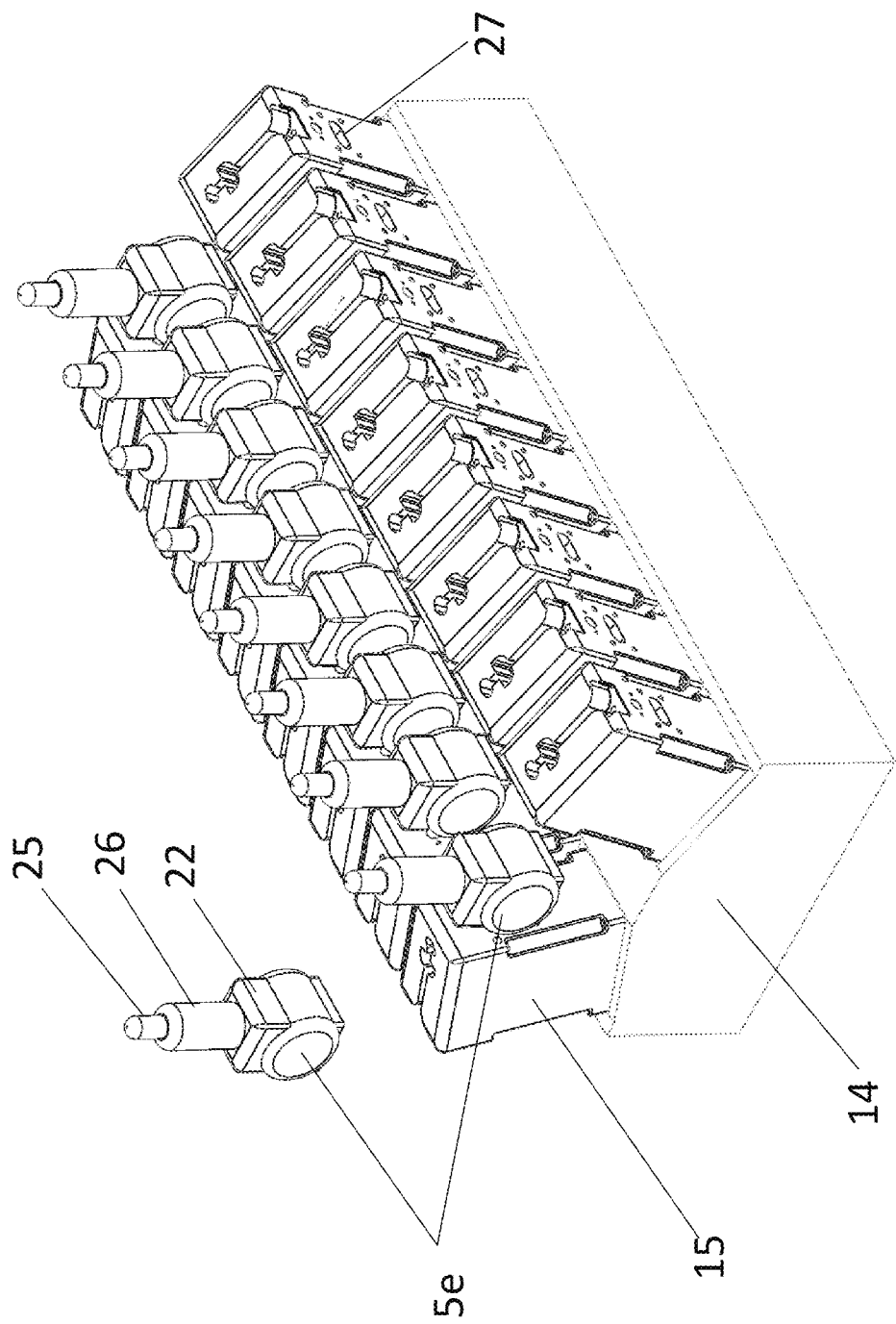

MODULAR HEAT EXCHANGER AND CONVERSION SYSTEM

DESCRIPTION OF THE INVENTION

This application claims the benefit of priority under 35 U.S.C. §119(e) of U.S. Provisional Application No. 61/343,242, filed Apr. 26, 2010, which is incorporated herein by reference in its entirety.

FIELD OF THE INVENTION

Various embodiments of the present invention generally relate to a heat exchanger and related methods for use in, for example, a waste heat recovery system. In particular, certain exemplary embodiments relate to a modular, high-pressure heat exchanger configured to be coupled to an integral turbine-alternator system for waste heat recovery.

DESCRIPTION OF RELATED ART

A variety of industrial processes and/or thermodynamic engines discharge waste heat into the environment. For example, in combustion engines such as diesel-electric generators or locomotive engines, electric and propulsion power are generated with 30% to 35% efficiencies. Reduced efficiencies results when these engines are operated outside of their optimal operational conditions. Idling, acceleration transients, and low- and high-power engine operations generally represent non-optimum conditions. Engine efficiency can be further decreased for engines with purely mechanical or unsophisticated fuel metering controls.

For most combustion engine applications, and under most operating conditions, 22% to 46% of the total energy of the fuel used by the combustion engine is normally lost through exhaust gases and engine cooling, which represent waste heat discharged into the environment. Recovering such waste heat and converting it into usable energy may directly result in, for example, increased efficiency, fuel savings as well as reduction in pollutant emission and thermal discharge into the environment.

Accordingly, there is a need for developing a heat recovery and conversion system and related methods for use in recovering and/or converting waste heat into useable energy.

SUMMARY

Therefore, various exemplary embodiments of the present disclosure may provide a heat recovery and conversion system capable of reliably and cost-effectively recovering and converting waste heat energy. For example, certain exemplary embodiments provide a modular, high-pressure heat exchanger for extracting waste heat energy from various thermodynamic systems and a conversion system for ultimately transforming the extracted waste heat energy into electricity and/or other forms of usable energy.

One exemplary aspect may provide a scalable, modular waste heat energy recovery and integral conversion system configured to convert waste heat energy produced by any source that rejects thermal energy into the environment, to heat a working fluid circulating within a modular heat exchanger thermally and hydraulically coupled and integrated with a waste heat conversion system.

The working fluid can be a suitable fluid with thermal-physical properties that favor phase changes from sub-cooled liquid to superheated vapor when exposed to low-grade heat transfer from any waste heat source fluids to the working fluid.

The modular heat exchanger all together with the integrated waste heat conversion system may be configured to match the ever changing thermodynamic parameters characterizing variable waste heat production sources, especially when these sources are represented by internal combustion engines.

Another aspect may utilize the scalable, modular heat exchanger and integral waste heat conversion systems on internal combustion engines, wherein the waste heat recovery and conversion system may be formed by coupling at least one turbine expander to an alternator and to an air compressor for the conversion of waste heat energy into electricity and compressed air respectively through a system that can be non-invasively retrofitted on existing combustion engine platforms as well as to new combustion engines utilized for hybrid application (e.g., diesel-electric, gas-electric, etc.).

Although bottom cycle technologies dedicated to combustion engines generally show low efficiencies, high manufacturing cost, high maintenance costs, and low reliability, the present invention is intended to provide a solution to the low-reliability, and high-costs represented by similar technologies by means of relatively simple to manufacture high-pressure heat exchangers with geometries and materials that cost-effectively withstand the harsh conditions in which this equipment operates and that can be assembled as multiple module to match the waste heat source capacity. The flexible modular and thermal-hydraulic connectivity feature of the waste heat energy recovery and conversion technology characterizing the present invention allows retrofitting schemes that do not require heavy financing as individual modules can be installed gradually and in a sequence wherein savings attained by the operation of each module over time can result in "self-financing" for the installation of additional modules up to matching the total waste heat source energy capacity.

Waste heat energy transported, for example, by the fluids circulating in the cooling system and exhaust gas tubing of an industrial process or a combustion engine heats up a suitable working fluid inside a modular heat exchanger in thermal contact with the fluids transporting waste heat energy without mixing with these fluids. By means of the modular heat exchanger, the working fluid expands by changing thermodynamic state from liquid to superheated vapor within fluid-dynamically optimized channels derived internally the high-pressure heat exchanger.

The channels are formed by surfaces within the modular heat exchanger configured so as to increase the working fluid residence time and to enhance the working fluid thermal coupling with the fluids transporting waste heat energy. The residence time is increased by utilizing channel geometries that force the working fluid through pathways that increase turbulence while the working fluid accelerates as a result of its expansion through the channels and as a result of heat energy transfer from the high-pressure heat exchanger internal surfaces.

Furthermore, residence time is enhanced by configuring the working fluid and the fluids transporting waste heat energy so as to essentially swirl or rotate the working fluid and the fluids transporting waste heat energy while wetting and surrounding the surfaces forming the waste heat source system.

The thermal coupling between the working fluid and the fluids transporting waste heat energy occurs without mixing and is enhanced by utilizing suitable high thermal conductivity materials that form the support structures of the channels so as to make them capable of withstanding high-pressure, thermal stresses and mechanical deformation on all axes. As the working fluid travels through the modular heat exchanger, it changes the phase from liquid to super heated vapor. At this point, the superheated working fluid exiting the modular heat exchanger may enter a series of modular heat exchangers so as to increase the waste heat energy transfer to the working fluid, for direct or indirect expansion of the superheated working fluid vapors within at least one set of turbine-alternator systems for the conversion of the working fluid energy into mechanical and electrical energy respectively.

Depending on the application, the modular heat exchanger and waste heat conversion system formed by a turbine and alternator may be mechanically or thermal-hydraulically coupled to an air compressor system for the generation of compressed air. When compressed air is provided to the intake manifold of a combustion engine, the results are pollutant emission reductions and engine performance enhancement.

Finally, the working fluid exhausting from the turbine system is made to condense within a sudden-condensation chamber, thereby causing a vacuum at the turbine outlet and resulting in increased waste heat recovery and conversion system efficiency.

Certain exemplary embodiments of the present disclosure focus on bottom cycle applications and make its utilization commercially viable in the context of, for example, internal combustion engine applications. Also, various exemplary embodiments may provide the ability of the modular heat exchanger and its integral waste heat conversion systems to be minimally invasive, sufficiently rugged to withstand full flame immersion for operation in highly corrosive environments for a long period of time, and cost-effectiveness. Overall, the modular heat exchanger and its integral waste heat conversion system may efficiently transform low- and high-grade waste heat energy into re-usable energy without significantly interfering with the fluid-dynamic conditions characterizing the fluids transporting waste heat energy from the waste heat sources into the environment.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3B is another perspective view of the conduit and the modular heat exchanger of FIG. 3.

FIG. 4 is an axial cross-sectional view of the modular heat exchanger of FIG. 2, illustrating various components and their structural configurations.

FIG. 8A is a top view of an internal combustion engine, where, in addition to the modular heat exchangers integrated with an exhaustion pipe of a combustion engine, a series of modular heat exchangers are integrated with a closed loop cooling piping system of the internal combustion engine wherein engine fluids transporting waste heat energy may transfer thermal energy to the working fluid circulating within the modular heat exchangers.

FIG. 10B is a schematic illustration of multiple modular integral waste heat recovery and conversion systems applied to internal combustion engines, wherein the modular heat exchangers may be integrated with dedicated waste heat energy conversion systems formed by turbine, alternator, and compressor and configured as a cluster of independent modules serving selected cylinders of the internal combustion engine.

DESCRIPTION OF THE EXEMPLARY EMBODIMENTS

Figure 1:
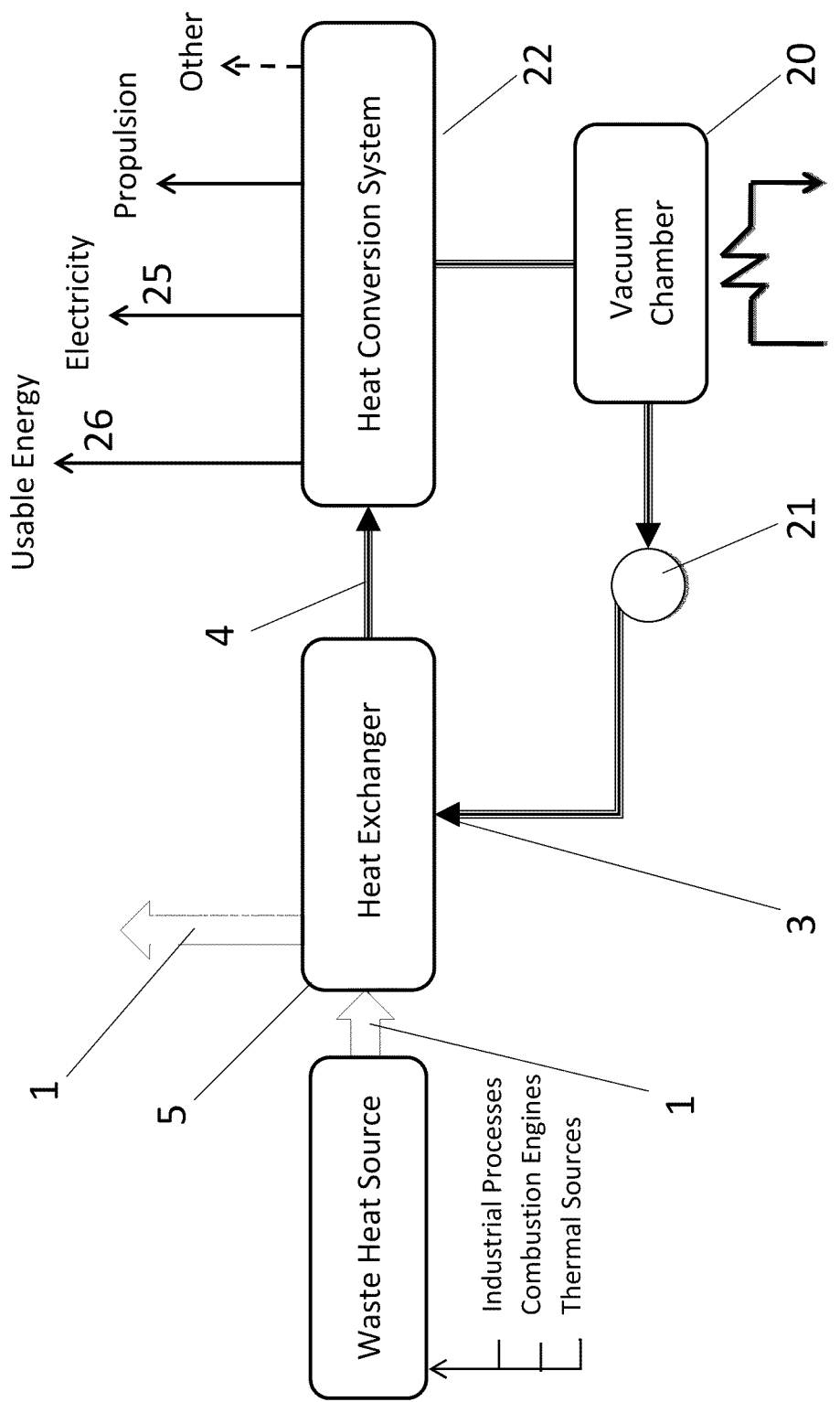
FIG. 1 is a schematic diagram illustrating exemplary applications of a heat recovery and conversion system according to one exemplary embodiment.

Reference will now be made in detail to the exemplary embodiments of the invention, examples of which are illustrated in the accompanying drawings. Wherever possible, the same reference numbers or letters will be used throughout the drawings to refer to the same or like parts.

Various exemplary embodiments of the present disclosure provide a waste heat recovery and conversion system configured to convert waste heat energy discharged into the environment. In some exemplary embodiments, the heat recovery component (e.g., heat exchanger) and the conversion component (e.g., an expander, electric generator, compressor, and torque generator) may be integrated into a single modular system. For example, as will be described in more detail later, the waste heat recovery and conversion system utilizes waste heat energy to heat a working fluid circulating within an heat exchanger thermally and hydraulically coupled and integrated with a heat conversion system formed by one or more turbine expanders coupled to energy conversion systems (e.g., an electric generator, compressor, and torque generator).

The working fluid may be any fluid having thermal-physical properties that favor phase changes from sub-cooled liquid to superheated vapor when exposed to any waste heat source. The waste heat source may comprise combustion gases from combustion engines, steam or hot gases from various industrial processes, and waste liquids rejected into the environment or cooled down by closed-loop cooling system prior to being discharged into the environment.

The scalable modular heat exchanger all together with the integrated waste heat conversion system of the present invention may be configured to tolerate the stressors generated by ever changing thermodynamic parameters characterizing variable waste heat production sources, especially when these sources are represented by internal combustion engines. To attain the advantages and in accordance with the purpose of the invention, as embodied and broadly described herein, one aspect of the invention provides means to utilize the scalable modular heat exchanger and integral waste heat conversion systems for internal combustion engine applications, wherein the waste heat recovery and conversion system may be formed by coupling at least one turbine expander to an alternator and to an air compressor for the conversion of waste heat energy into electricity and compressed air respectively through a configuration that can be non-invasively retrofitted on existing combustion engine platforms, as well as to new combustion engines utilized for direct propulsion or for hybrid applications (e.g. diesel-electric vehicles, gas-electric vehicles, and stationary combustion-engine driven electric generator platforms).

As waste heat sources may be represented by different configurations utilizing various fluids for the rejection of waste heat energy into the environment, an objective of the present invention is to provide a universal, scalable, modular, waste heat recovery and integral conversion system for the conversion of various forms of waste heat energy into useful energy easily and with minimally invasively configurations highly adaptable to various waste heat sources. Depending on the application, the grade, or temperature, of the waste heat source (e.g. high-, intermediate-, low-grade) and mass-flow-rate of the fluids transporting waste heat energy for final rejection into the environment, the scalable modular heat exchanger and integral conversion system of the present invention can be coupled in parallel, in series, or any hybrid configuration (e.g. series and parallel). Similarly, the modules forming the embodiment of the invention can be scaled to directly match the waste heat source rating by employing a large single module, or clusters of modules that all together match the total waste heat energy outputted from the waste heat source.

FIG. 1 schematic diagram illustrating various industrial applications of a heat recovery and conversion system according to one exemplary embodiment of the present disclosure. As shown in FIG. 1, the conversion of waste heat energy into usable energy results in a lower thermal rejection into the environment as a portion of the waste heat energy normally discharged in the environment is converted into usable forms of energy. Hot fluids 1 (e.g., gases, liquids), transporting waste heat energy from the waste heat source to the final mass and heat transfer discharge into the environment, are made to exchange thermal energy with the modular heat exchangers 5 wherein the working fluid circulates in a closed-loop.

As the waste heat source fluids 1 transfer thermal energy to the working fluid the waste heat source fluids 1 lower their energy content, thereby are discharged into the environment at lower temperatures. The working fluid enters the modular heat exchanger 5 at inlet 3 in a sub-cooled liquid state and exits the high-pressure heat exchangers 5 at the outlet 4 in a superheated vapor state.

Once the working fluid exits outlet 4, it expands within an integral turbine 22, alternator 25, compressor 26 system for the conversion of waste heat energy into electricity and compressed air. This configuration is particularly suitable to waste heat recovery and conversion applications dedicated to internal combustion engines coupled to electric generators as the waste heat recovery and conversion technology of the present invention converts the great majority of the recovered waste heat energy into electricity for ready electrical voltage and phase coupling with the electrical generator and equipment driven by the internal combustion engine.

The conversion of a portion of the waste heat energy into compressed air may be required to satisfy anti-pollution features of the waste heat recovery and conversion invention, as it provides the combustion engine with excess oxygen (air) when the engine operates at low Revolution per Minute (RpM) and/or at high transient loads. Most internal combustion engines operating in these conditions manifest high pollutant emissions. Therefore, providing compressed air as a result of waste heat recovery and conversion results in pollutant emission reductions, while enhancing the combustion engine performance at low RpM and during transients in which the duty cycle is changed from low-to high-loads.

For waste heat sources characterized by non air-breathing processes (e.g. requiring compressed air to improve their pollutant emissions), the modular heat exchanger may be configured to provide working fluid power to an integral turbine-alternator system for electricity production only. Should applications require conversion of waste heat energy into mechanical torque, the working fluid may be expanded through an integral turbine coupled, most likely via gear-box or through a magnetic or hydraulic clutch, so as to provide shaft work. As the working fluid exits the integral turbine system it enters a vacuum chamber 20 cooled by the air entering the compressor (not shown in this Figure), or by a second fluid, to condense the working fluid prior to pumping it at high-pressure within the modular heat exchangers via pump 21.

As shown in FIG. 1, the waste heat recovery and conversion system may comprise a Waste Heat Source containing the fluids 1 that transport waste heat energy from the waste heat source to the environment, one or more high-pressure heat exchangers 5 wherein a suitable working fluid circulates at high pressure through an inlet 3 and an outlet 4, by means of a high-pressure pump 21 and for the transfer of waste heat energy transported by the waste heat source fluids 1 into the working fluid, an integral waste heat conversion system 22 formed by a turbine, an alternator 25, and a compressor 26, a vacuum chamber 20 for the condensation of the working fluid by cooling means represented by the air entering the compressor 26 (see FIG. 9) or by a second fluid.

The working fluid may be represented by water which may be used to describe the exemplary embodiments of the invention. It should be understood, however, that any other fluid having suitable thermodynamic properties may be used alternatively or additionally.

With reference to FIG. 2, 3A, 3B, and 4, various operational processes occurring within the high-pressure heat exchanger are described in detail.

Figure 2:
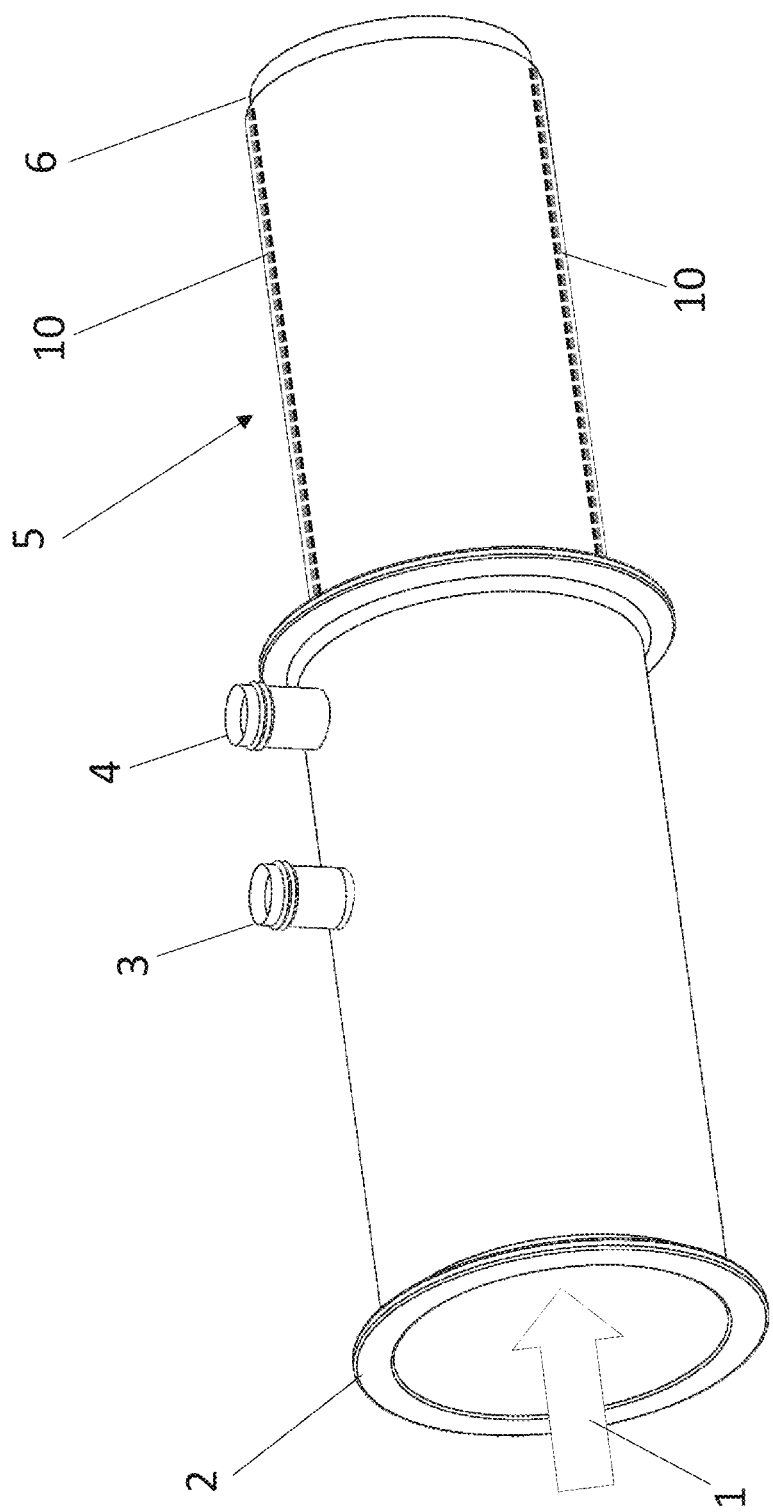
FIG. 2 is a perspective view of a retrofittable conduit for transporting fluids that carry waste heat energy from a waste heat source and a modular heat exchanger integrally coupled to the conduit. The fluids may be directly or indirectly discharged into the environment.

FIG. 2 is a schematic of a retrofitted basic conduit generally utilized to transport waste heat energy from the waste heat source to the environment through fluids that are directly or indirectly discharged into the environment. In this configuration, thermal and mechanical coupling of fluids 1 with modular heat exchangers may provide a easy to manufacture and install waste heat energy recovery system. In this Figure, the waste heat source fluids 1 enter a generic tubing or conduit system generally utilized to transport high- and low-grade waste heat energy from the waste heat source to a cooling heat exchanger (e.g. cooling tower for industrial processes, radiator for internal combustion engines) or to a discharge outlet venting into the environment (e.g. muffler system for an internal combustion engine, or discharge water or waste stream system for industrial processes).

With reference to FIG. 2, hydraulic conduit 2 may be represented by a cylindrical tube utilized for the displacement of waste heat fluids 1 from the waste heat source origin to the outlet for final discharge of fluids 1 into the environment. Hydraulic conduit 2 may have any geometry. For applications in which fluids 1 are recycled, hydraulic conduit 2 represents the thermal-hydraulic circuit transporting waste heat energy fluids to a cooling heat exchanger. A working fluid circulates through the high-pressure heat exchanger 5 by entering the heat exchanger at high-pressure inlet 3, and exiting it at high-pressure outlet 4.

Figure 3A:
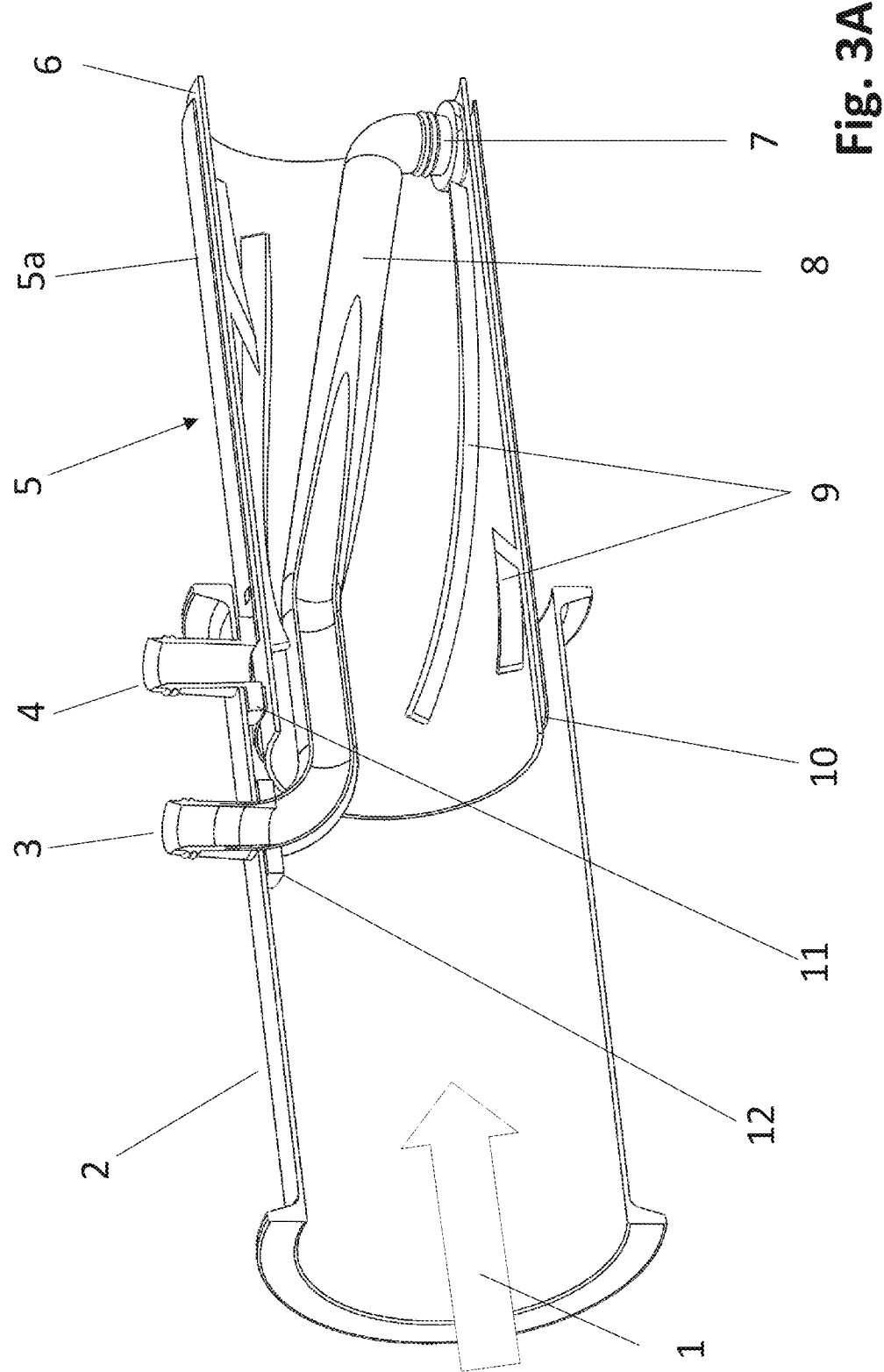
FIG. 3A is a side cross-sectional view of the conduit and the modular heat exchanger of FIG. 2.

With reference to FIGS. 3A, 3B, and 4, the high-pressure heat exchanger 5 is formed by an inner cylinder 6 and an outer cylinder 5a. The inner cylinder 6 and outer cylinder 5a are coaxial and form a jacket-like structure enclosing an expansion chamber 10 formed by the annular gap comprised by the inner walls of the outer cylinder 5a and the outer walls of the inner cylinder 6. The inner cylinder 6 and outer cylinder 5a are sealed at the edge, for example, by welding the inner and outer cylinders 6 and 5a through a radial weld at the top and bottom sections of the two cylinders.

The working fluid enters the modular heat exchanger 5 through the system of high-pressure fitting forming inlet 3 and the sealing fitting 12 hydraulically connected to a thermal-hydraulic connection 8. Fitting 12 ensures sealing of the waste heat energy conduit 2 and prevents waste heat energy fluids 1 from exiting conduit 2 at this location. Working fluid and waste heat fluids 1 do not mix.

As working fluid travels into thermal-hydraulic connection 8 it receives a first transfer of waste heat energy as thermal-hydraulic connection 8 is fully immersed in the waste heat fluids pathway. Thermal-hydraulic connection 8 connects the high-pressure inlet 3 with the inner cylinder 6 by means of a sealed port represented by fitting 7. As the working fluid enters chamber 10 formed by the annular gap separating the inner cylinder 6 from the outer cylinder 5a, it continues to expand and accelerate in a counter-flow fashion as it flows in a direction opposite to that of the waste heat fluids Chamber 10 develops around inner cylinder 6 and forms turbulent channels for the working fluid to increase residence time and enhance heat transfer. While outer cylinder 5a sustains high-pressure exerting forces developing within chamber 10 in the outward radial direction, inner cylinder 6 sustains high-pressures that results in forces directed inward. For these reasons inner cylinder 6 is equipped with structural and fluid-dynamic fins 9 that develop in a manner to form low back-pressure blades along the inner walls of inner cylinder 6. Similar blades can be formed on the outer walls of outer cylinder 5a. Fins 9 have therefore the purpose of increasing structural robustness allowing for high pressure to develop within chamber 10 while the materials of heat exchanger 5 simultaneously withstand high pressures, high temperatures, and heat exchanger expansions and contractions while waste heat energy transporting fluids may be characterized by severe temperature excursions.

As the working fluid expands inside the channels forming chamber 10 it rotates throughout the chamber by grooves etched or machined on the surface of inner cylinder 6 (not shown). By inducing rotation of the working fluid while transiting inside chamber 10 its residence time is increased while enhancing turbulence and heat transfer. As the working fluid expands inside chamber 10 it reaches high-pressure outlet port 11 represented by a fitting sealed to the outer wall of outer cylinder 5a.

As waste heat fluids 1 travel through the modular heat exchanger 5 the rotate due to the effect of fins 9 acting as heat transfer fins as well as fluid dynamic blades to force the waste heat energy transporting fluids 1 to increase their residence time within the heat exchanger and enhance heat transferring from the waste heat source to the working fluid. As the working fluid expands inside chamber 10 under the effect of waste heat energy transfer it becomes superheated by a degree proportional to the dimensions of the modular heat exchanger, the rate of waste heat energy being transported by fluids 1 through conduit 2, the temperature of the waste heat energy transporting fluids 1, the rate of working fluid being pumped through inlet 3, and the thermo-physical properties of the working fluid being utilized.

FIG. 4 provides a cross-sectional view represented by the equipment forming the modular heat exchanger and the back-pressure that may form as a result of the "obstruction" seen by fluids 1 while transiting through conduit 2. As fluids 1 travel through conduit 2 and the retrofitted modular heat exchanger 5, the actual cross sections seen by these fluids are mainly represented by the obstruction formed by thermal-hydraulic connection 8 and fins 9. However, fins 9 may be shaped and coiled to form minimum fluid dynamic resistance, and fluids 1 temperature decreases while traveling through the heat exchanger as a result of waste heat energy transfer to the cooler working fluid. As fluids 1 temperature decreases the specific volumes characterizing these fluids also decreases, thereby compensating for the potential back-pressure increase within conduit 2.

Figure 5:
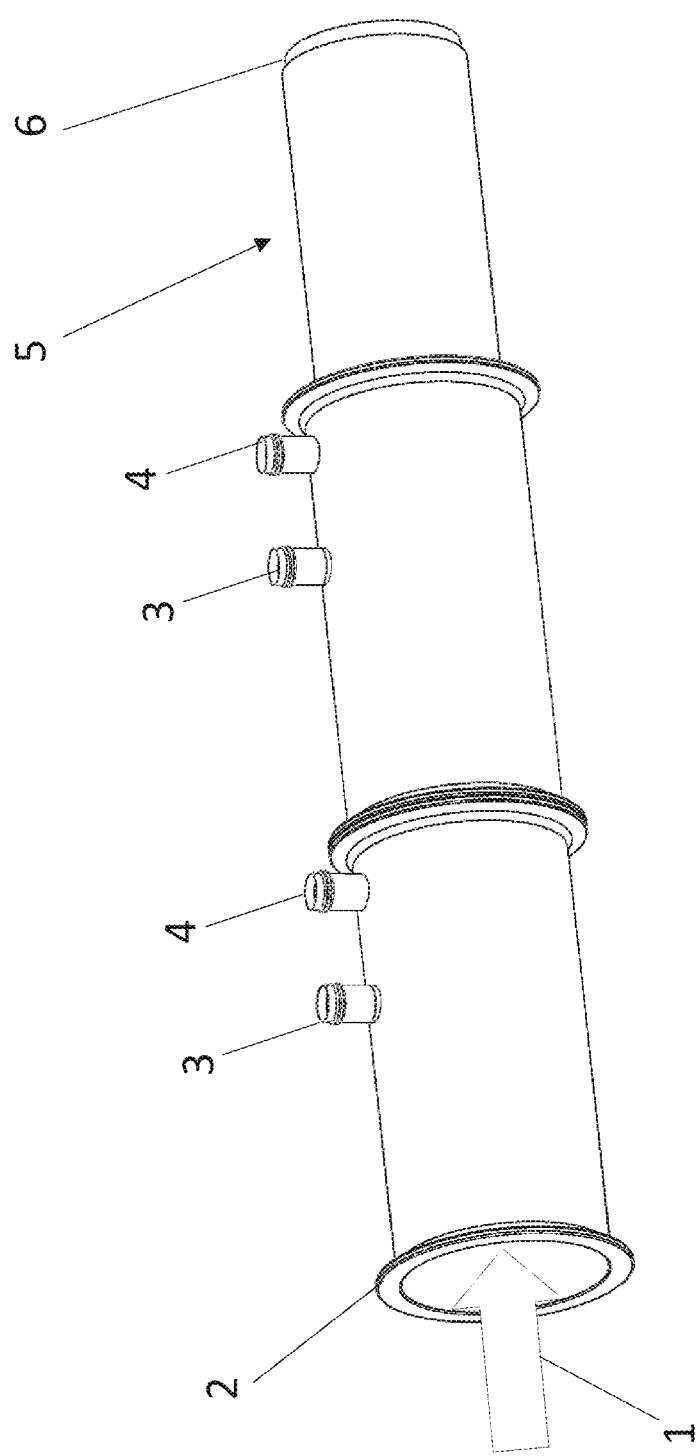
FIG. 5 is a perspective view of a retrofittable conduit and a plurality of modular heat exchangers connected in series, according to another exemplary embodiment of the present disclosure. Alternatively, the plurality of heat exchangers can be connected in parallel.

With reference to FIG. 5, a series of modular heat exchangers 5 may be connected together so as to increase waste heat energy transfer to the working fluid. These configurations allow scalability by simply adding modules and connecting the thermal-hydraulic connections 3 and 4 in series, parallel or hybrid configurations.

Figure 6:
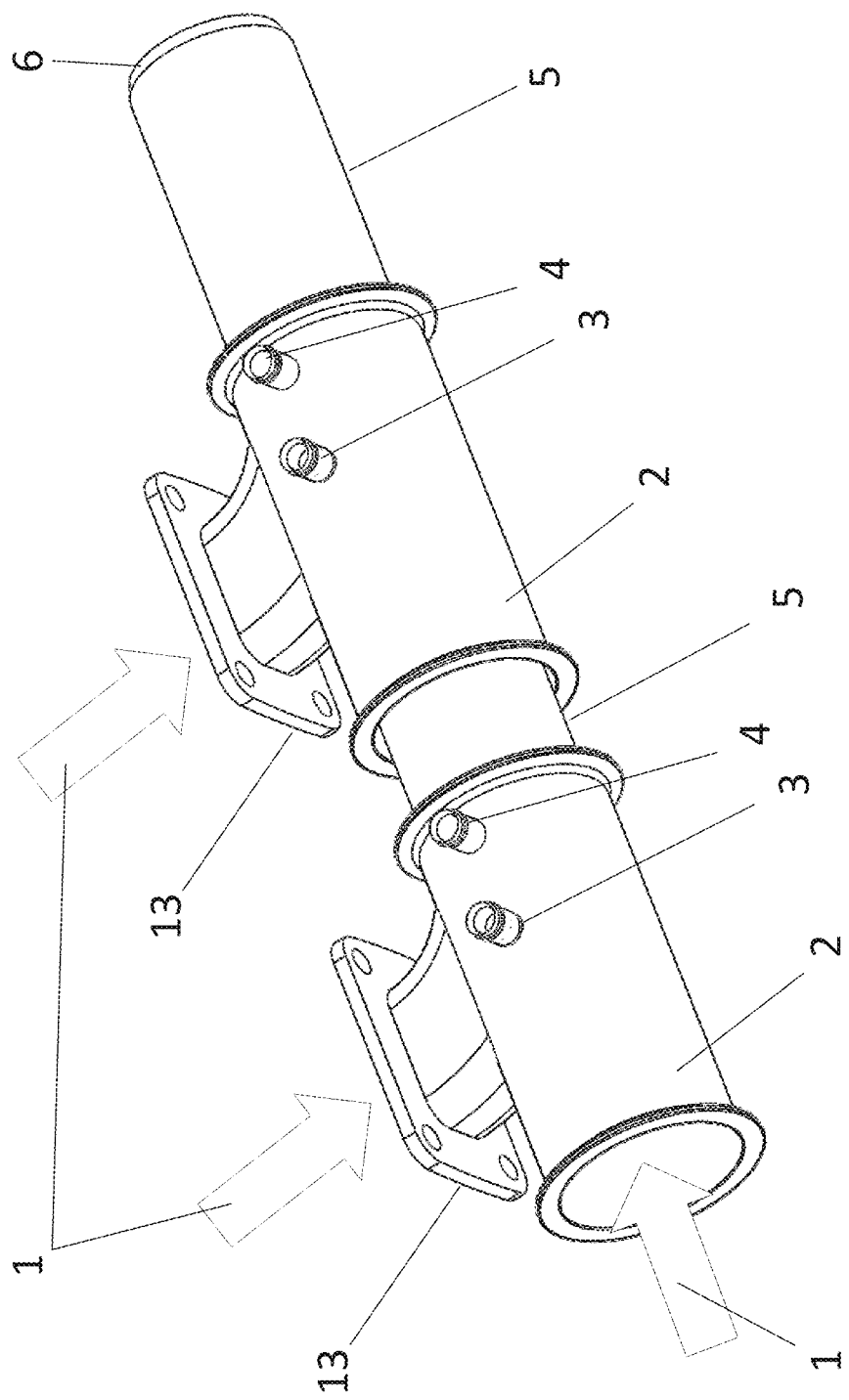
FIG. 6 is a schematic illustration of a plurality of modular heat exchangers integrally coupled to exhaust gas manifolds of an internal combustion engine, according to another exemplary embodiment.

FIG. 6 is a schematic illustration of a, according to an exemplary embodiment of the invention, series connection of exhaust gas manifolds as possibly utilized in internal combustion engines for the discharge of waste heat energy transporting fluids into the environment. In this configuration, the modular heat exchangers are integrated and thermally coupled with the exhaust manifolds through minimally invasive retrofitting, wherein waste heat energy transporting fluids 1 are represented by exhaust gases (e.g. produced by internal combustion engines). Conduit 2 is now represented by exhaust gas manifold flanged to the engine block through flange 13 (see also FIG. 7). As shown in this Figure, the high-pressure heat exchangers 5 are positioned/retrofitted inside of conduit 2 for a straight line configuration, however, as flexible members 2a (FIG. 8) seal each repeating conduit 2 by flanging the flexible members 2a to the conduits 2, the modular heat exchangers may be configured to follow curved contours as well.

Figure 7:
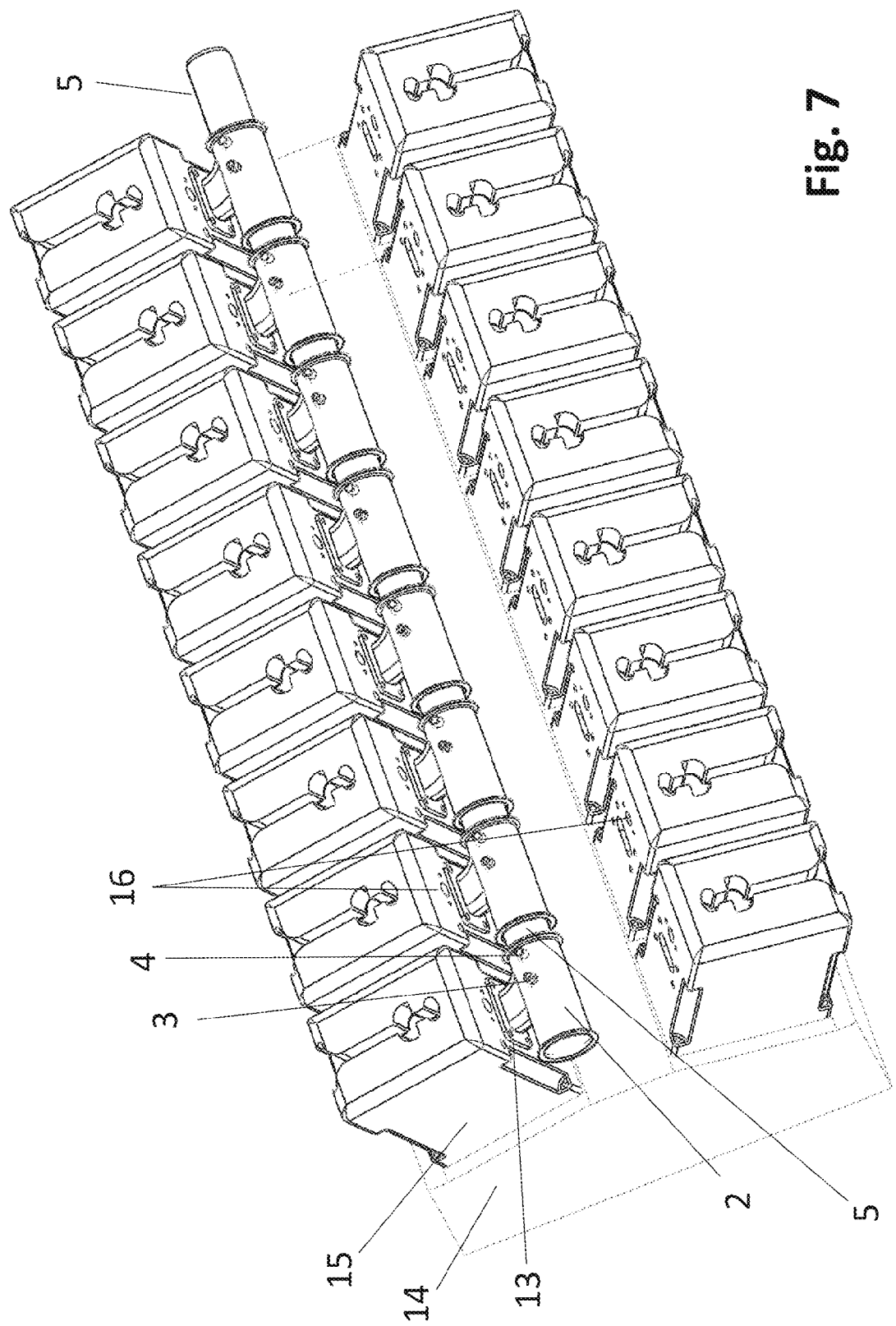
FIG. 7 is a schematic illustration of a plurality of modular heat exchangers integrally coupled to an exhaustion pipe of an internal combustion engine, according to another exemplary embodiment.

FIG. 7 is an exemplary embodiment of the invention applied to an internal combustion engine by means of integration of the modular waste heat recovery high-pressure heat exchangers with the internal combustion engine exhaust piping system. In this Figure a 16 cylinder V-configuration on an internal combustion engine block 14 is shown with one cylinder bank equipped with the modular heat exchangers 5 by connecting the retrofitted exhaust gas manifold forming conduit 2 through flange 13 to the exhaust gas port provided by the combustion engine cylinder 15. As it will be described in the discussion that follows additional modular heat exchangers may be thermal-hydraulically coupled with the cooling system fluids utilized in the combustion engine 14.

Figure 8B:
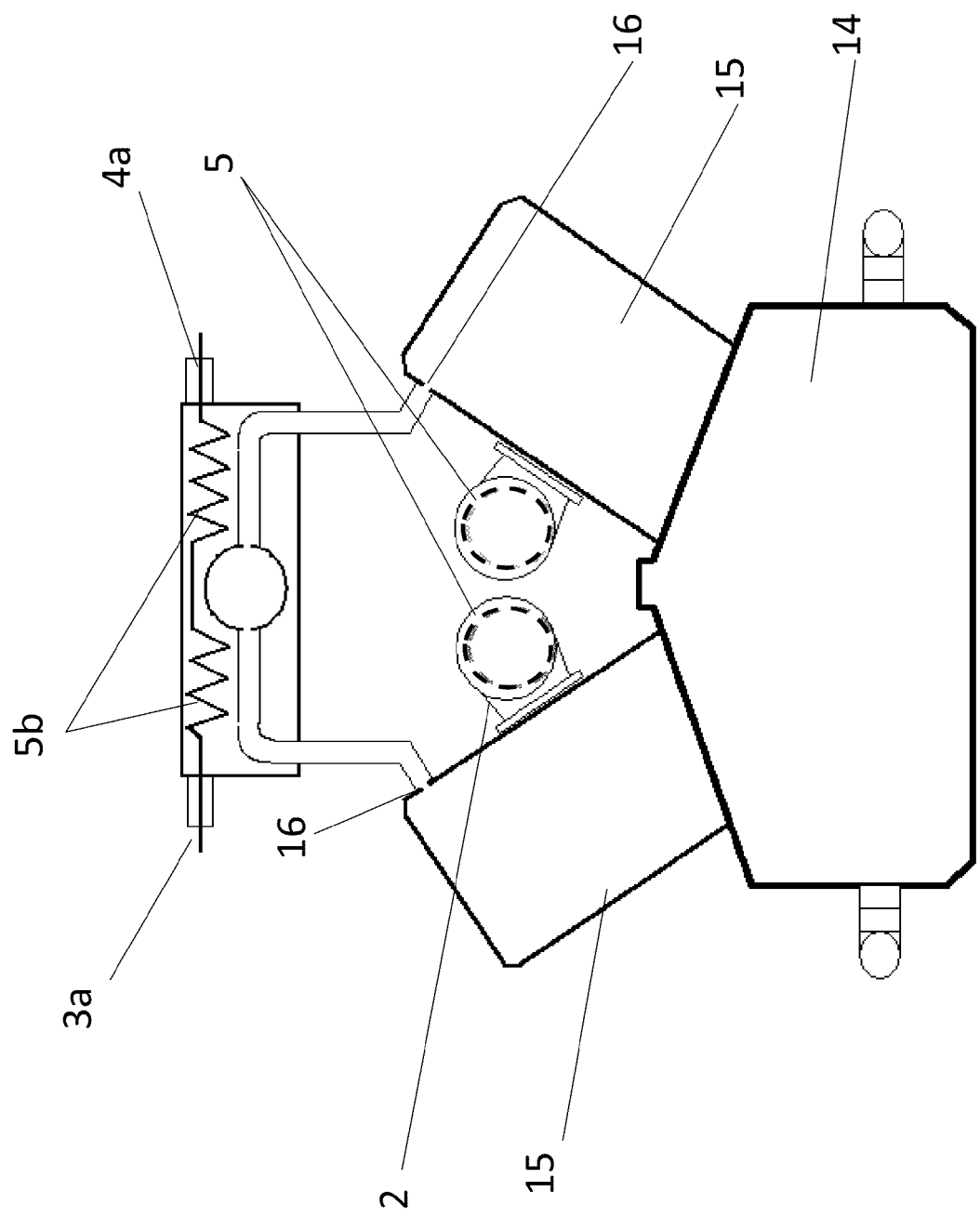
FIG. 8B is a side view of the internal combustion engine shown in FIG. 8A.

As shown in FIGS. 7, 8A, and 8B, the internal combustion engine cylinder(s) 15 provide ports for the hydraulic connection of the engine cooling system. The cooling system for most internal combustion engines operates on the principle of circulating coolant (e.g. water) through an internal jacket surrounding cylinder 15, and into a radiator for air cooling. FIGS. 8A and 8B provide a top and side schematic view of an internal combustion engine wherein in addition to the modular heat exchangers integrated with the combustion engine exhaust gas piping system, a series of modular heat exchangers may be integrated with the closed-loop cooling piping system of the internal combustion engine. The engine cooling system represents a piped system in which waste heat energy fluids 1 transport waste heat energy from the internal combustion engine 14 to the environment by means of a cooling heat exchanger (e.g. radiator). In this configuration, modular heat exchangers 5 may be configured as shown in FIGS. 2, 3, 4 and 5, except that the waste heat energy transporting fluids 1 may be represented by the internal combustion engine cooling fluid. As shown in FIG. 8, the modular heat exchangers 5 are represented by heat exchangers 5b with corresponding inlet 3a and 4a. In this configuration the high-pressure heat exchanger is immersed in the engine cooling fluid (representing fluids 1) without the working fluid mixing with the engine cooling fluid. This configuration allows for the working fluid to be increased in temperature while circulating through the high-pressure heat exchanger 5b, prior to expansion and superheating as a result of circulation through the modular heat exchangers 5. As shown in this Figure, the top view of the internal combustion engine 14 illustrates additional waste heat energy conduits represented by the exhaust gas diffuser 17 connected on one side to the exhaust gas piping systems flanged to each cylinder 15, and to the turbo charger 19 on the other side. Under normal operating conditions the exhaust gases (e.g. waste heat transporting fluids 1) expand in the turbo-charger system 18 and vent through the muffler 18. The modular heat exchangers can be configured to operate inside the conduit represented by the muffler 18 as waste heat energy transporting fluids 1 flows through this component prior to final discharge into the environment.

Figure 9A:
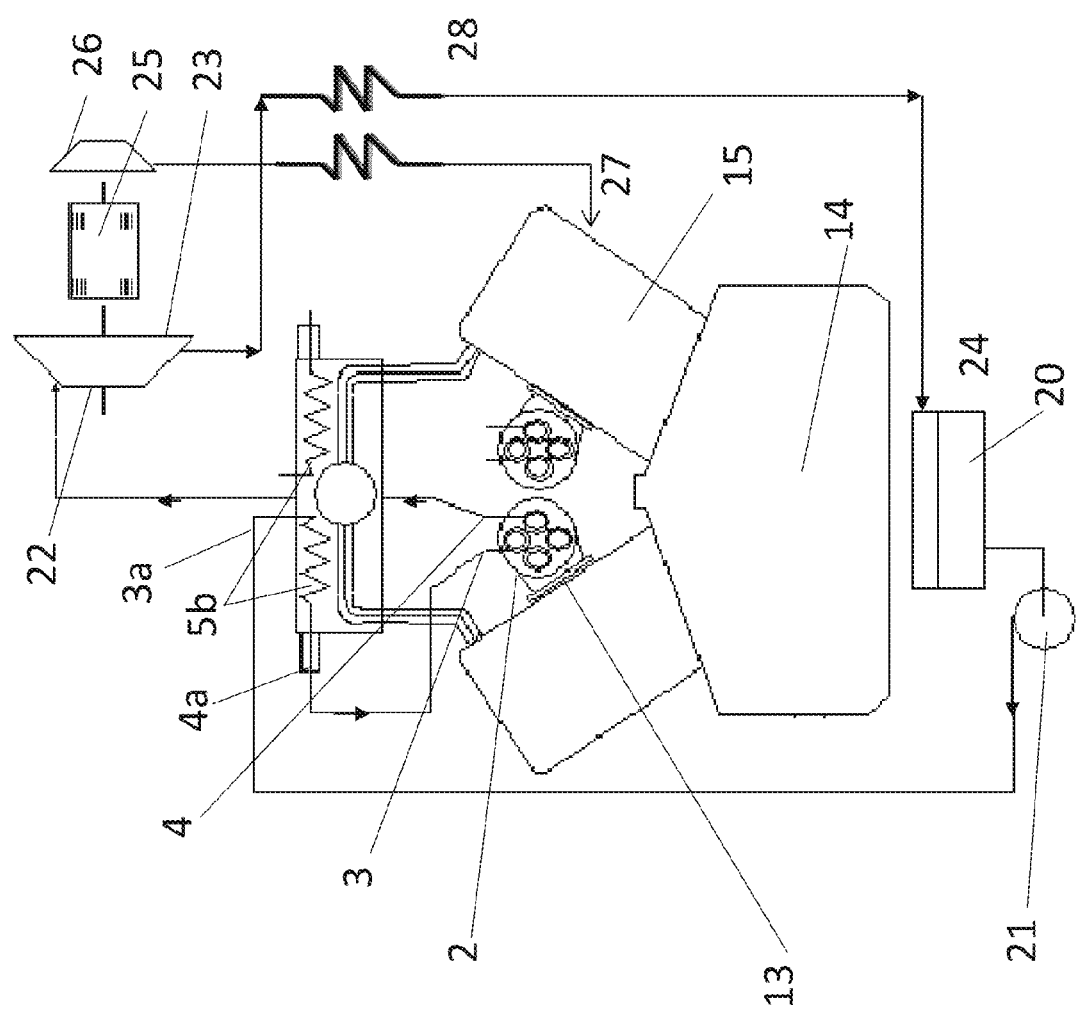
FIGS. 9A and 9B are schematic illustrations of multiple exemplary configurations of a modular heat exchanger configured to extract waste heat energy from the cooling and exhaust gas systems of an internal combustion engine.
Figure 9B:
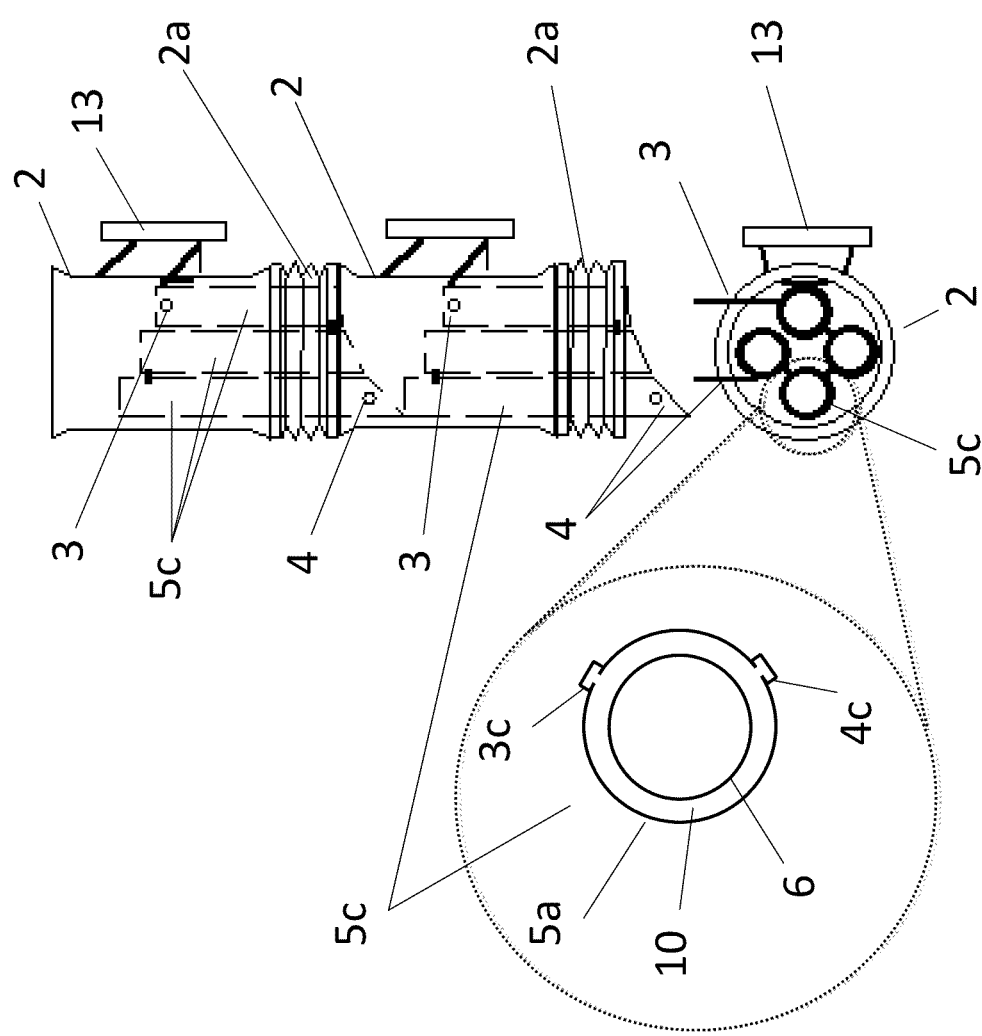

With reference to FIGS. 9A and 9B, a schematic illustration of multiple, according to an exemplary embodiment of the invention, configurations of modular heat exchangers is provided. In this configuration a complete waste heat recovery and conversion system is configured to extract waste heat energy from the cooling and exhaust gas systems of an internal combustion engine 14 wherein waste heat energy is converted into electricity and compressed air by means of an integral waste heat conversion system formed by turbine 22, alternator 25, and air-compressor 26.

In this configuration, the working fluid first receives waste thermal energy by entering the modular heat exchanger 5b at inlet 3a (as the system is symmetric and for easing the illustration only mirrored configurations are represented). As the working fluid exits the modular heat exchanger 5b with high energy content it enters one or multiple high-pressure heat exchangers 5c flanged to the engine exhaust gas port 13.

As waste heat fluids 1 (exhaust gases) transfer waste heat energy to the working fluid inside the modular heat exchangers 5c the working fluid becomes superheated vapor which expands through integral turbine 22. As the working fluid exits integral turbine 22 it may be configured to enter a heat exchanger for the creating of a vacuum in chamber 28.

Vacuum may be generated by the cooling action of air suctioned by the air compressor 26 or by the adoption of a second fluid which drive the working fluid to condense. The condensate is then collected in the condensate reservoir 20 wherein it is pumped back at high pressure into modular heat exchanger 5b and reset the circulatory cycle. In this Figure, the modular heat exchangers 5c are configured to offer a lower cross-sectional area with respect to the exhaust gases (waste heat transporting fluids 1), by employing multiple combinations of inner and outer cylinders 6 and 5a respectively and by eliminating the fins 9 (shown in FIGS. 3 and 4).

Figure 10A:
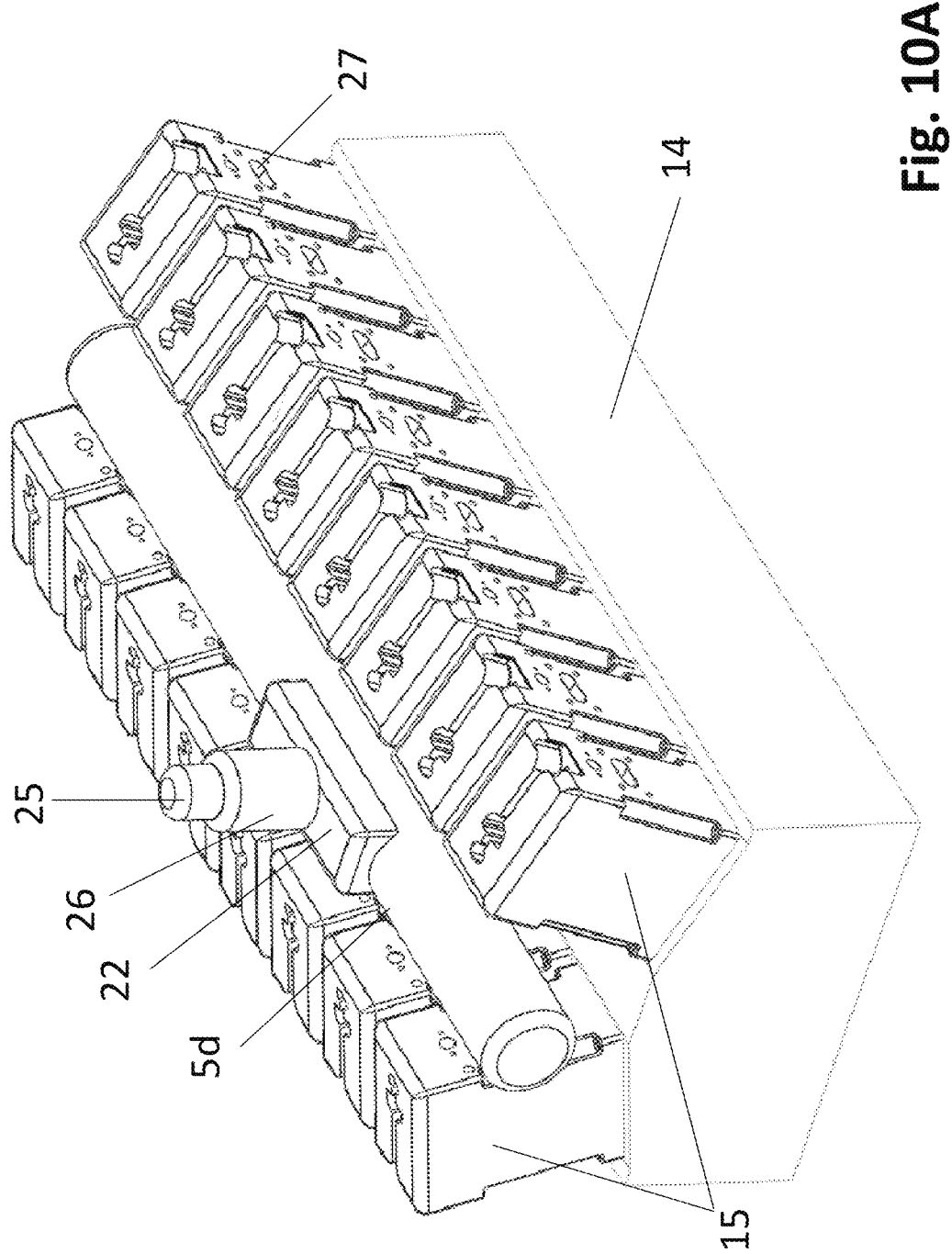
FIG. 10A is a schematic illustration of a single modular integral waste heat recovery and conversion system applied to internal combustion engines, wherein the modular exchangers may be integrated with the waste heat energy conversion system formed by turbine-alternator-compressor systems by scaling the modular heat exchangers so as to serve multiple combustion engine cylinders (or waste heat sources) by coupling each internal combustion engine exhaust gas port with a single integral waste heat conversion system.

FIG. 10A is a schematic illustration of a single modular integral waste heat recovery and conversion system configured, according to an exemplary embodiment of the invention applied to internal combustion engines, wherein a single modular heat exchanger system 5d may be integrated with the waste heat energy conversion system formed by turbine 22, alternator 25, and compressor 26 by scaling the modular heat exchangers 5d so as to serve multiple combustion engine cylinders 15 by coupling each internal combustion engine exhaust gas port with a single integral waste heat conversion system.

FIG. 10B is a schematic illustration of multiple modular integral waste heat recovery and conversion systems configured, according to an exemplary embodiment of the invention applied to internal combustion engines, wherein the modular heat exchangers 5e may be integrated with dedicated waste heat energy conversion systems formed by dedicated turbine 22, alternator 25, and compressor 26 and configured as a cluster of independent modules serving selected cylinders 15 of the internal combustion engine 14.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A waste heat energy recovery system comprising:
 a conduit through which a first fluid for transporting heat from a heat source flows; and
 a heat exchanger at least partially disposed inside the conduit for transferring heat from the first fluid to a second fluid,
 wherein the heat exchanger comprises:
  an inlet configured to receive the second fluid;
  an outlet configured to discharge the second fluid;

a first tube disposed within the conduit, the first tube having an inner wall defining a first passageway through which the first fluid flows;

a second tube disposed concentrically between the conduit and the first tube, wherein an outer wall of the second tube and an inner wall of the conduit define a second passageway through which the first fluid flows, and wherein an outer wall of the first tube and an inner wall of the second tube define a fluid channel through which the second fluid flows, the fluid channel being in fluid communication between the inlet and the outlet for circulating the second fluid; and a connector comprising a pipe having a first end connected to either the inlet or the outlet and a second end connected to a port on the inner wall of the first tube that connects to the fluid channel.

2. The system of claim 1, further comprising:

a turbine expander configured to receive the second fluid and convert the energy of the second fluid into shaft energy;

an electric generator configured to convert a first portion of the shaft energy into electricity;

a vacuum chamber connected to the turbine expander for cooling and collecting the second fluid by heat exchange with a third fluid;

a compressor coaxial with the turbine expander and the electric generator, the compressor configured to:
convert a second portion of the shaft energy to compress the third fluid, and
cool the second fluid after discharge from the turbine expander using the third fluid;

a pump configured to circulate the second fluid from the vacuum chamber to the heat exchanger;

a reservoir for collecting the second fluid; and a second heat exchanger configured to cool the second fluid with the third fluid.

3. The system of claim 1, wherein the heat exchanger comprises a plurality of modular heat exchangers, each of the modular heat exchangers comprising an interchangeable inlet and outlet for circulating the second fluid.

4. The system of claim 3, wherein each of the modular heat exchangers comprises a turbine expander, an electric generator, and an air compressor in a modular housing.

5. The system of claim 1, wherein the fluid channel is configured to increase turbulence of the second fluid flowing therethrough.

6. The system of claim 1, wherein the first tube is configured to induce greater turbulence of the first fluid in the first passageway.

7. The system of claim 1, further comprising one or more fins on the inner wall of the first tube, the one or more fins causing a rotary motion of the first fluid in the first passageway.

8. The system of claim 1, wherein the first fluid flows through both the first and second passageways in a first axial direction to transfer heat to the second fluid flowing in the fluid channel.

9. The system of claim 1, further comprising a pre-heating heat exchanger configured to exchange heat between the second fluid and a third fluid to pre-heat the second fluid, wherein the third fluid is heated by a second heat source.

10. A waste heat energy recovery system comprising:

a conduit through which a first fluid for transporting heat from a heat source flows; and a heat exchanger at least partially disposed inside the conduit for transferring heat from the first fluid to a second fluid, the heat exchanger comprising:

an inlet for receiving the second fluid;

an outlet for discharging the second fluid;

a first tube disposed within the conduit, the first tube having an inner wall defining a first passageway through which the first fluid flows in a first axial direction;

a second tube positioned radially between the first tube and the conduit, wherein an outer wall of the second tube and an inner wall of the conduit define a second passageway through which the first fluid flows in the first axial direction, and wherein an outer wall of the first tube and an inner wall of the second tube define a fluid channel through which the second fluid flows in a second, opposing axial direction;

a fitting on the inner wall of the first tube for connecting to the fluid channel; and a connector comprising a pipe having a first end connected to either the inlet or the outlet and a second end connected to the fitting on the inner wall of the first tube that connects to the fluid channel.

11. The system of claim 10, wherein the heat exchanger comprises a plurality of modular heat exchangers, each of the modular heat exchangers comprising an interchangeable inlet and outlet for circulating the second fluid.

12. The system of claim 11, wherein each of the modular heat exchangers comprises a turbine expander, an electric generator, and an air compressor in a modular housing.

13. The system of claim 10, further comprising one or more fins on the inner wall of the first tube that cause a rotary motion of the first fluid in the first passageway.

14. The system of claim 1, wherein the connector is at least partially disposed within the first passageway defined by the first tube through which the first fluid flows.

15. The system of claim 1, wherein:

the port extends through a fitting sealed to the inner wall of the first tube; and the connector conveys the second fluid from the inlet to the fluid channel via the fitting.

16. The system of claim 10, wherein:

a port extends through the fitting sealed to the inner wall of the first tube; and the connector conveys the second fluid from the inlet to the fluid channel via the fitting.

17. A waste heat energy recovery system comprising:

a conduit that transports a first fluid flowing from a heat source; and a heat exchanger comprising:

a first tube disposed within the conduit and comprising an interior wall and an exterior wall;

a second tube disposed within the conduit and comprising an interior wall and an exterior wall;

a first fluid channel defined within the interior wall of the first tube, wherein the first fluid flows through the first fluid channel in a first axial direction;

a second fluid channel defined between the exterior wall of the second tube and an interior wall of the conduit, wherein the first fluid also flows through the second fluid channel in the first axial direction;

a third fluid channel defined between the exterior wall of the first tube and the interior wall of the second tube, wherein a second fluid flows through the third fluid channel in a second, opposing axial direction;

an inlet through which the second fluid is introduced into the heat exchanger;

a connector providing a fourth fluid channel from the inlet to the third fluid channel, the fourth fluid channel having a first end connected to the inlet and a second end connected to a port on the interior wall of the first tube that connects to the third fluid channel, wherein the second fluid flows through the fourth fluid channel in the first axial direction; and an outlet through which the second fluid is discharged from the heat exchanger, wherein the second fluid flows through the third fluid channel toward the outlet.

18. The system of claim 17, further comprising a groove in the third fluid channel to increase turbulence of the second fluid flowing therethrough.

19. The system of claim 17, further comprising one or more fins on the interior wall of the first tube for causing a rotary motion of the first fluid in the first fluid channel.

20. The system of claim 17, wherein the conduit is an exhaust pipe of a combustion engine.

21. The system of claim 1, wherein the conduit is an exhaust pipe of a combustion engine.

22. The system of claim 1, wherein at least one of the inlet and outlet of the heat exchanger is disposed on a sidewall of the conduit for receiving the second fluid in a direction substantially perpendicular to a flow direction of the first fluid inside the first passageway.

\* \* \* \* \*